United States Patent
Tousignant Gendron et al.

(10) Patent No.: US 11,778,715 B2
(45) Date of Patent: Oct. 3, 2023

(54) APPARATUS AND METHOD FOR POWERLINE COMMUNICATION CONTROL OF ELECTRICAL DEVICES

(71) Applicant: LMPG Inc., Longueuil (CA)

(72) Inventors: William Tousignant Gendron, Quebec (CA); Mario Lepage, Quebec (CA); Greg Campbell, Walpole, MA (US); Guillaume Boucher, Quebec (CA)

(73) Assignee: LMPG INC., Quebec (CA)

( * ) Notice: Subject to any disclaimer, the term of this patent is extended or adjusted under 35 U.S.C. 154(b) by 0 days.

(21) Appl. No.: 17/557,238

(22) Filed: Dec. 21, 2021

(65) Prior Publication Data

US 2022/0201826 A1 Jun. 23, 2022

Related U.S. Application Data

(60) Provisional application No. 63/129,881, filed on Dec. 23, 2020.

(51) Int. Cl.
| | |
|---|---|
| H05B 47/185 | (2020.01) |
| H05B 47/10 | (2020.01) |
| H05B 41/38 | (2006.01) |
| H04B 3/54 | (2006.01) |
| H05B 45/10 | (2020.01) |

(52) U.S. Cl.
CPC ............ H05B 47/185 (2020.01); H04B 3/54 (2013.01); H05B 45/10 (2020.01)

(58) Field of Classification Search
CPC ......... H05B 47/185; H05B 45/10; H04B 3/54
See application file for complete search history.

(56) References Cited

U.S. PATENT DOCUMENTS

| | | | |
|---|---|---|---|
| 4,815,106 A | 3/1989 | Propp et al. | |
| 4,889,999 A | 12/1989 | Rowen | |

(Continued)

FOREIGN PATENT DOCUMENTS

| | | |
|---|---|---|
| AU | 20090200556 | 9/2009 |
| DE | 102006028670 | 12/2007 |

(Continued)

OTHER PUBLICATIONS

International Preliminary Report on Patentability from related PCT Application No. PCT/US2015/021704 dated Oct. 4, 2016.

(Continued)

*Primary Examiner* — Minh D A
(74) *Attorney, Agent, or Firm* — Burns & Levinson, LLP; Joseph M. Maraia; Steven M. Mills

(57) ABSTRACT

A powerline communication control system for controlling a lighting unit, such as an LED lighting unit, including a master controller for receiving lighting unit control inputs from a lighting controller and generating corresponding lighting unit command outputs in a lighting system command format and transmission mode and superimposing the lighting unit command outputs onto the power distribution system and at least one lighting slave unit for receiving the lighting command signal, separating the lighting command signal from the power signal and for providing lighting unit control commands to the at least one lighting unit to control illumination thereof, entirely within a modem embedded into a microcontroller.

21 Claims, 9 Drawing Sheets

(56) References Cited

U.S. PATENT DOCUMENTS

| | | | |
|---|---|---|---|
| 5,260,974 | A | 11/1993 | Johnson et al. |
| 5,350,977 | A | 9/1994 | Hamamoto et al. |
| 5,455,490 | A | 10/1995 | Callahan et al. |
| 5,668,446 | A | 9/1997 | Baker |
| 5,828,293 | A | 10/1998 | Rickard |
| 6,664,745 | B2 | 12/2003 | Belliveau |
| 6,867,558 | B2 | 3/2005 | Gaus, Jr. et al. |
| 7,230,522 | B2 | 6/2007 | Stevens |
| 7,307,542 | B1 | 12/2007 | Chandler et al. |
| 7,456,588 | B2 | 11/2008 | Alexandrov |
| 7,816,803 | B1 | 10/2010 | Notohamiprodjo et al. |
| 7,865,252 | B2 | 1/2011 | Clayton |
| 8,111,010 | B2 | 2/2012 | Zimmerman et al. |
| 8,115,419 | B2 | 2/2012 | Given et al. |
| 8,164,273 | B1 | 4/2012 | Harrington et al. |
| 8,330,380 | B2 | 12/2012 | Fujimura et al. |
| 8,368,315 | B2 | 2/2013 | Gaines et al. |
| 8,373,346 | B2 | 2/2013 | Hoogzaad |
| 8,410,630 | B2 | 4/2013 | Campbell |
| 8,508,147 | B2 | 8/2013 | Shen |
| 8,569,956 | B2 | 10/2013 | Shteynberg et al. |
| 8,692,786 | B2 | 4/2014 | Diederiks et al. |
| 8,698,404 | B2 | 4/2014 | Jin |
| 8,759,999 | B2 | 6/2014 | Campbell |
| 8,766,547 | B2 | 7/2014 | Kim |
| 8,768,493 | B2 | 7/2014 | Souvay et al. |
| 8,917,026 | B2 | 8/2014 | Ferrier |
| 8,912,734 | B2 | 12/2014 | Melanson et al. |
| 8,947,010 | B2 | 2/2015 | Barrow et al. |
| 8,957,595 | B2 | 2/2015 | Johnston et al. |
| 8,970,131 | B2 | 3/2015 | Brandes et al. |
| 9,024,464 | B2 | 5/2015 | Campbell |
| 9,066,405 | B2 | 6/2015 | van de Ven |
| 9,185,759 | B2 | 11/2015 | Nieberlein et al. |
| 9,307,619 | B2 | 4/2016 | Campbell |
| 9,622,329 | B2 | 4/2017 | Campbell |
| 10,462,879 | B2 | 10/2019 | Campbell |
| 10,838,478 | B1 * | 11/2020 | Eswaran ............... G06F 1/3231 |
| 2002/0065583 | A1 | 5/2002 | Okada et al. |
| 2002/0163316 | A1 | 11/2002 | Lys et al. |
| 2003/0146715 | A1 | 8/2003 | Suomi |
| 2004/0225811 | A1 | 11/2004 | Fosler |
| 2005/0225976 | A1 | 10/2005 | Zampini et al. |
| 2006/0170376 | A1 | 8/2006 | Piepgras et al. |
| 2006/0274540 | A1 | 12/2006 | Klaver et al. |
| 2007/0057641 | A1 | 3/2007 | Russell et al. |
| 2007/0233323 | A1 | 10/2007 | Wiemeyer et al. |
| 2007/0247089 | A1 | 10/2007 | Summerland |
| 2008/0150450 | A1 | 6/2008 | Starr et al. |
| 2008/0157939 | A1 | 7/2008 | Sutardja |
| 2008/0224636 | A1 | 9/2008 | Melanson |
| 2008/0297065 | A1 | 12/2008 | Mubaslat et al. |
| 2009/0128061 | A1 | 5/2009 | Dilley et al. |
| 2009/0171510 | A1 | 7/2009 | Hu |
| 2009/0184662 | A1 | 7/2009 | Given et al. |
| 2010/0090607 | A1 | 4/2010 | Vos |
| 2010/0102747 | A1 | 4/2010 | Ilyes et al. |
| 2010/0109558 | A1 | 5/2010 | Chew |
| 2010/0141169 | A1 | 6/2010 | Summerland et al. |
| 2010/0176733 | A1 | 7/2010 | King |
| 2010/0194298 | A1 | 8/2010 | Kuwabara |
| 2010/0308739 | A1 | 12/2010 | Shteynberg et al. |
| 2011/0032085 | A1 | 2/2011 | Maros et al. |
| 2011/0043124 | A1 | 2/2011 | Johnston et al. |
| 2011/0043129 | A1 | 2/2011 | Koolen |
| 2011/0050113 | A1 | 3/2011 | VanDoorme et al. |
| 2011/0050132 | A1 | 3/2011 | Hooijer et al. |
| 2011/0084622 | A1 | 4/2011 | Barrow et al. |
| 2011/0121754 | A1 | 5/2011 | Shteynberg et al. |
| 2011/0140611 | A1 | 6/2011 | Elek et al. |
| 2011/0187275 | A1 | 8/2011 | Giltaca et al. |
| 2011/0204820 | A1 | 8/2011 | Tikkanen et al. |
| 2011/0276193 | A1 | 11/2011 | Bowman et al. |
| 2011/0291583 | A1 | 12/2011 | Shen |
| 2012/0056556 | A1 | 3/2012 | Laski et al. |
| 2012/0098444 | A1 | 4/2012 | Peng |
| 2012/0133298 | A1 * | 5/2012 | Campbell ............ H05B 47/185 |
| | | | 315/250 |
| 2012/0306375 | A1 | 12/2012 | van de Ven |
| 2013/0049600 | A1 | 2/2013 | Kim |
| 2013/0088171 | A1 | 4/2013 | Fensore |
| 2013/0278156 | A1 | 10/2013 | Hanyuda et al. |
| 2013/0278163 | A1 | 10/2013 | Rodriguez et al. |
| 2014/0320031 | A1 | 10/2014 | Wu et al. |
| 2014/0354178 | A1 | 12/2014 | Siessegger et al. |
| 2015/0351191 | A1 | 12/2015 | Pope et al. |
| 2018/0368737 | A1 * | 12/2018 | Bonomi ............. A61B 5/02438 |

FOREIGN PATENT DOCUMENTS

| | | |
|---|---|---|
| DE | 102006062751 | 1/2008 |
| DE | 102007040152 | 3/2008 |
| DE | 102012006316 | 10/2013 |
| DE | 102012006341 | 10/2013 |
| EP | 1460775 | 9/2004 |
| EP | 1465464 | 10/2004 |
| GB | 2335334 | 9/1999 |
| JP | 2009054987 | 3/2009 |
| WO | WO2009013656 | 1/2009 |
| WO | WO2009133489 | 11/2009 |
| WO | WO2011081633 | 7/2011 |
| WO | WO2011121011 | 10/2011 |
| WO | WO2012009622 | 1/2012 |

OTHER PUBLICATIONS

International Search Report dated Jul. 1, 2015 in corresponding PCT Application No. PCT/US2015/021704 (11 pgs.).
Machine translation of JP2009054987A, 16 pages.

* cited by examiner

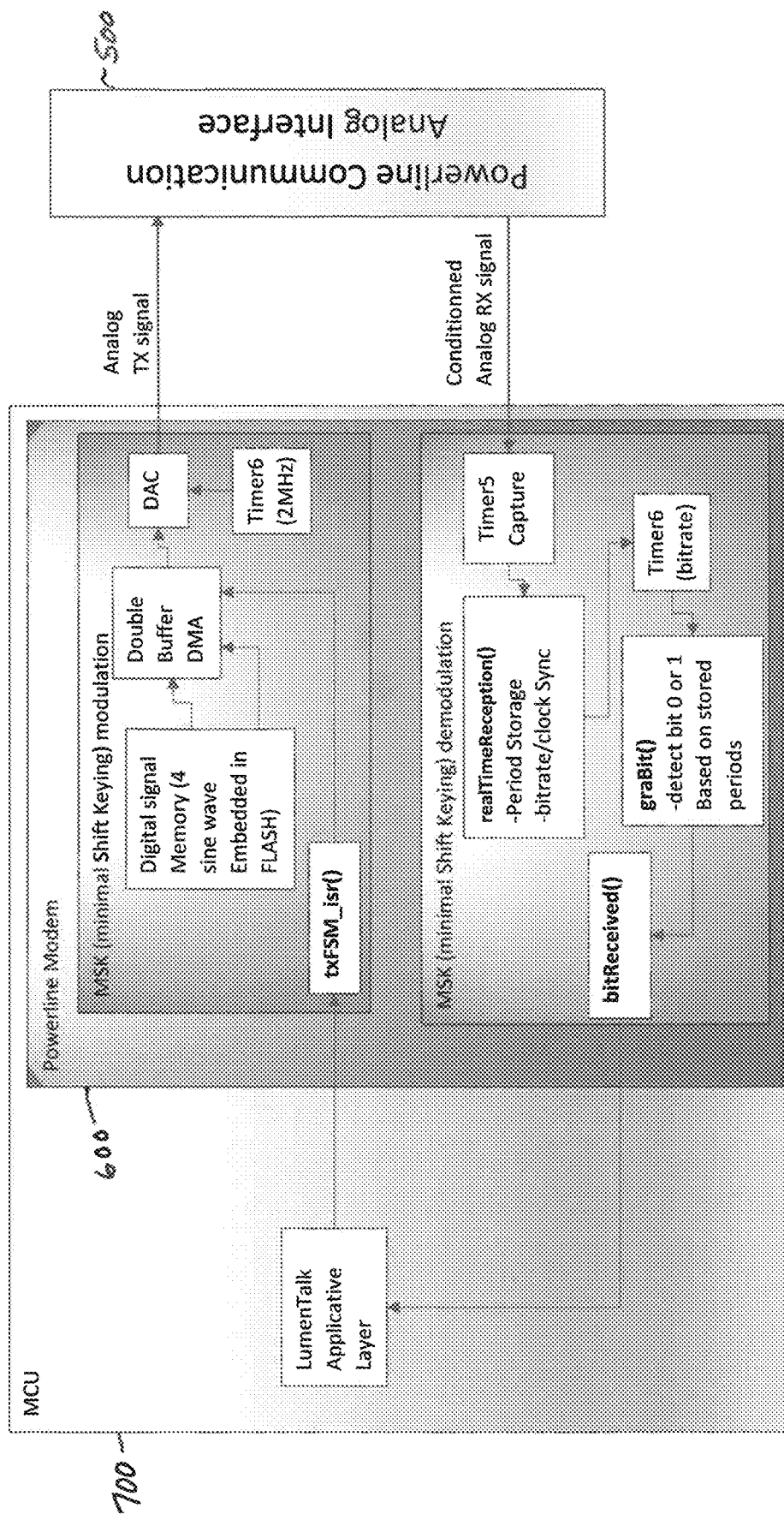
Figure 1 - LTK on MCU internal structure

APPARATUS AND METHOD FOR POWERLINE COMMUNICATION CONTROL OF ELECTRICAL DEVICES

RELATED APPLICATIONS

This application is related to and claims the benefit of U.S. Provisional Application No. 63/129,881, filed on Dec. 23, 2020, the entire contents of which are incorporated herein by reference.

FIELD OF THE INVENTION

The present invention is related to the powerline communication control of electrical devices and, in particular, to the powerline communication control of lighting fixtures.

BACKGROUND

Powerline communication systems, often called powerline carrier communication systems, enable systems to carry data on a conductor that is also used for electric power transmission, such as a conventional 120 volt AC line, a 230 volt AC line (such as used in Europe), a 100 volt AC line (such as used in Japan), a 277 volt AC line (such as used in certain commercial applications in the United States) or a 347 volt AC line (such as used in certain commercial applications in Canada). There are many different ways to communicate on a powerline, but ultimately all communication is done by impressing a modulated carrier signal onto the system power conductors together with the 120 volt AC power signal and separating the power signal and the communications signals at a receiving point. While powerline communication applications are commonly seen in the utility meter reading and home automation markets, for example, for a number of reasons they are essentially nonexistent in architectural solid state lighting systems.

Among the problems that hinder the adoption of solid state lighting systems, that is, light emitting diode (LED) lighting systems, and especially white light lighting systems, is the question of control of the light level output of LED lighting systems, that is, dimming control, which is much more complex than in the case of conventional lighting systems because of the greater electrical complexity of the LED lighting fixtures. For example, common industry standard methods for dimming control of lighting systems are 0-10V dimmers, the Digital Addressable Lighting Interface (DALI), and digital multiplex remote device management (DMX/RDM), which provide digital control of the power output of lighting systems. These methods are effective, but require the provision of control wiring separate from the conventional AC power lines. The addition of 0-10V dimmers, DALI, or DMX/RDM to a lighting installation thus generally requires the retrofitting of any proposed installation site with the necessary control wiring, which typically requires ripping out existing wiring and the addition of new control wiring. The addition of convention dimming controls, such as 0-10V dimmers, DALI, or DMX/RDM to a lighting installation thereby often imposes significant additional costs as well as additional time to accomplish the installation of the control wiring and controls. The present invention provides a solution to the above noted as well as other related problems associated with the prior art.

SUMMARY

The present invention is directed to a powerline communication control system for controlling a light emitting diode (LED) lighting unit comprised of one or more white or red, green and blue LEDs, or combinations thereof, and the associated circuitry for controlling the light outputs of the LEDs of the fixture, in a single microcontroller.

A powerline communication control unit of the present invention includes a master controller that includes a lighting control command processor for receiving a lighting unit control input from a lighting controller and generating corresponding lighting unit command outputs in a lighting system command format and a power distribution system interface connected to a power distribution system for superimposing the lighting unit command outputs onto the power distribution system and a power signal present thereon as a lighting command signal according to a lighting unit command transmission mode.

The system further includes at least one lighting slave unit including at least one LED lighting unit, a command receiving interface connected from the power distribution system for receiving the lighting command signal, separating the lighting command signal from the power signal and generating corresponding slave control commands, a slave control processor for converting the received slave control commands into lighting unit control commands, and a lighting unit interface for providing the lighting unit control commands to the at least one lighting unit to control the at least one lighting unit, wherein the master controller and the plurality of lighting fixture controllers comprise a modem embedded into a microcontroller.

In one embodiment of the present invention, each master controller includes: for each lighting controller, a corresponding lighting control conversion circuit for converting control inputs from a corresponding lighting controller into corresponding command inputs to the microprocessor.

In another embodiment of the present invention, a master controller includes: a lighting controller and a lighting control conversion circuit for converting control inputs from the lighting controller into the command inputs to the microprocessor.

In another aspect, the microcontroller of the powerline communication control system includes direct memory access (DMA), timer, and digital-to-analog converter (DAC), and a physical layer and a data link layer for open systems interconnections. The operation of the physical layer includes FSK modulation (TX) and demodulation (RX) capabilities. The FSK modulation utilizes a DAC to generate the FSK signal, and the DAC is fed with a sine wave table by DMA, and the DMA is fed by a first buffer which feeds the DAC and a second buffer configured to receive a signal from the microcontroller in order to provide a continuous signal from the DAC. The DAC output is fed to a TX analog front end (AFE).

In one aspect, at least one embodiment described herein provides a powerline communication control system for controlling a lighting fixture includes a master controller and at least one lighting fixture controller. The master controller includes a configurable interface, a lighting control processor and a power distribution system interface. The configurable interface is suitable for interconnecting to at least one of several different conventional dimmer controllers and the lighting control processor. The lighting control processor is adapted to generate a lighting unit command output in a lighting unit system command format in response to an indication of a user-adjusted setting of an interconnected one of the several different conventional dimmer controllers received from the configurable interface. The power distribution system interface is in communication with the lighting control processor and adapted for interconnection to a power distribution system. The power distribution system interface is adapted to superimpose the lighting unit system command output onto the power distribution system when connected thereto. The at least one lighting fixture controller includes a command receiving interface, a slave control processor and a lighting unit interface. The command receiving interface is adapted for interconnection to the power distribution system and for separating the lighting unit system command output from the power distribution system when connected thereto. The slave control processor is in communication with the command receiving interface and adapted to convert the received lighting unit system command output into a corresponding lighting unit control command. The lighting unit interface is configured for providing the lighting unit control command to at least one lighting unit. The lighting unit interface is configured to control the at least one lighting unit in response to the user-adjusted setting of the interconnected one of the conventional dimmers. The master controller and the plurality of lighting fixture controllers comprise a modem embedded into a microcontroller.

In another aspect, at least one embodiment described herein provides a master controller for powerline communication including a configurable interface suitable for interconnecting to one of several different conventional dimmer controllers. The master controller includes a lighting control processor and a power distribution system interface. The lighting control processor is in communication with the configurable interface and adapted to generate a lighting unit command output in a lighting unit system command format in response to an indication of a user-adjusted setting of an interconnected one of the several different conventional dimmer controllers received from the configurable interface. The power distribution system interface is in communication with the lighting control processor and adapted for interconnection to a power distribution system. The power distribution system interface is adapted to superimpose the lighting unit system command output onto the power distribution system when connected thereto.

In yet another aspect, at least one embodiment described herein provides a process for controlling a lighting fixture, including determining a user-adjusted setting of one of a plurality of different conventional dimmer controllers. The process also includes generating a lighting unit command output in a lighting unit system command format in response to the determined user-adjusted setting of the conventional dimmer controllers. The lighting unit command output is distributed through a power distribution system to at least one lighting fixture. The lighting unit command output is converted at the at least one lighting fixture into a corresponding lighting unit control command. At least one lighting unit is controlled in response to the user-adjusted setting of the interconnected one of the conventional dimmers.

In yet another aspect, at least one embodiment described herein provides a master controller for powerline communication including direct memory access (DMA), timer, and digital-to-analog converter (DAC), and a physical layer and a data link layer for open systems interconnections. The operation of the physical layer includes FSK modulation (TX) and demodulation (RX) capabilities. The FSK modulation utilizes a DAC to generate the FSK signal, and the DAC is fed with a sine wave table by DMA, and the DMA is fed by a first buffer which feeds the DAC and a second buffer configured to receive a signal from the microcontroller in order to provide a continuous signal from the DAC. The DAC output is fed to a TX analog front end (AFE).

BRIEF DESCRIPTION OF THE DRAWINGS

The present disclosure will now be described more fully hereinafter with reference to the accompanying drawings, in which preferred embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout. Other objects, features and advantages of the present disclosure will become apparent from the detailed description of the disclosure, which follows when considered in light of the accompanying drawings.

FIG. 9 is a flow diagram of individual functional blocks of LTK on microcontroller internal structure, and is analogous to FIGS. 1-3.

DETAILED DESCRIPTION

Powerline communication as referred to herein can be the powerline communication described in detail in U.S. Pat. No. 8,410,630, entitled, "Powerline Communication Control of Light Emitting Diode (LED) Lighting Fixtures," by Campbell, the entire content of which is incorporated herein by reference. Modulation of a frequency shift keying (FSK) carrier used in connection with the technology described herein can be as described in detail in U.S. Pat. No. 5,852,636, entitled, "Method of and Apparatus for Modulation of FSK Carrier in a Very Narrow Band," by Mathieu, et al., the entire content of which is incorporated herein by reference.

Figure 1:
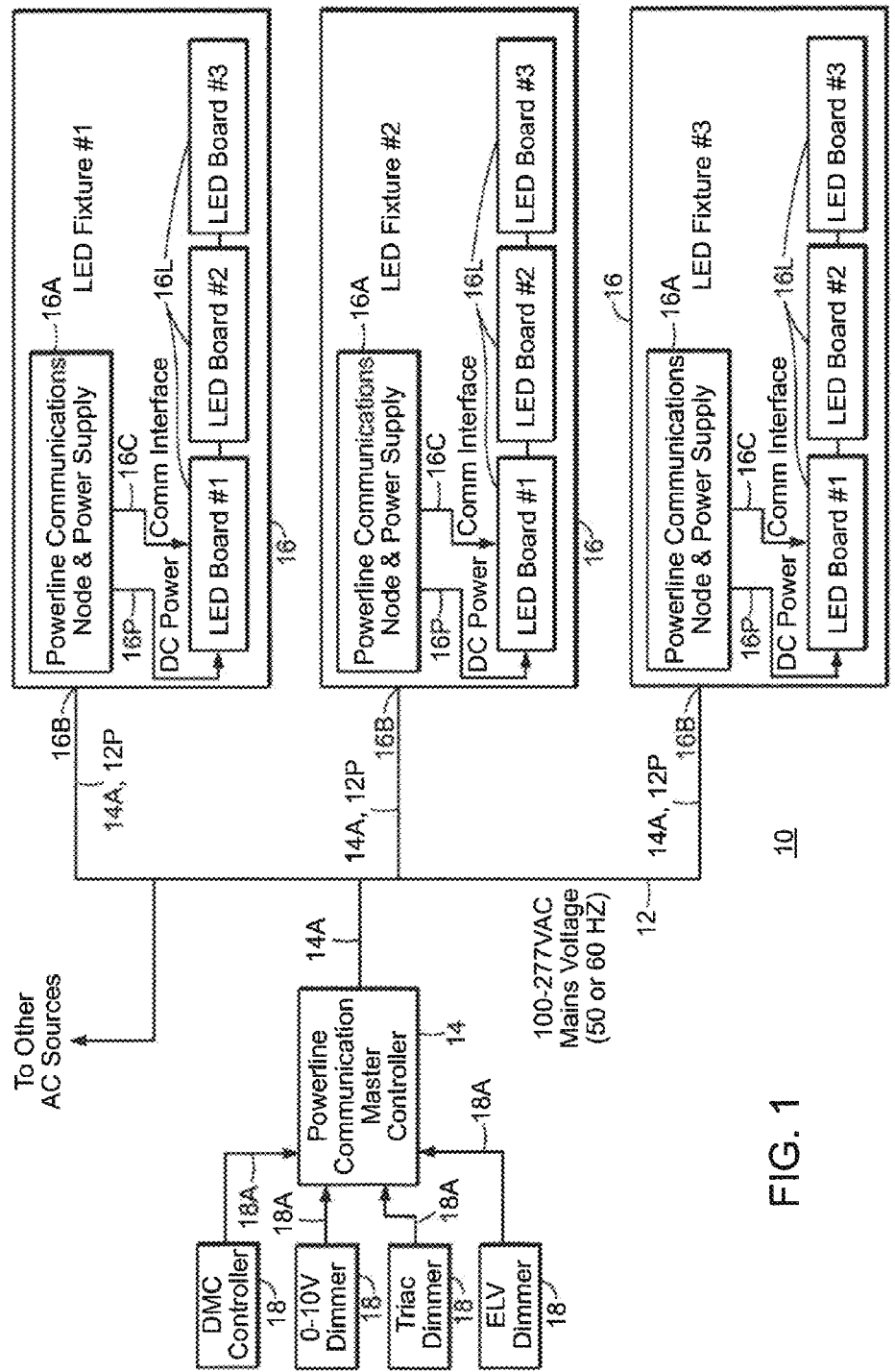
FIG. 1 is a functional block diagram of an embodiment of a powerline communication control system for LED lighting fixtures.

FIG. 1 includes a schematic block diagram of a powerline communication control system 10 for LED lighting fixtures. Referring to FIG. 1, as illustrated, powerline communication control system 10 includes a conventional power distribution system 12, such as a 120 volt AC network, at least one master controller 14 and one or more LED fixture slave units 16, three of which are diagrammatically shown in FIG. 1. It is to be appreciated that the number of slave units 16 can vary depending upon the particular application. The control output 14A from each master controller 14 is connected via the power distribution system 12, to supply a separate control input to one or more of the slave units 16.

In some exemplary embodiments, master controller 14 is coupled to one or more conventional dimmer controllers 18, four of which are diagrammatically shown in FIG. 1. It is to be appreciated that the number of dimmer controllers 18 can vary depending upon the particular application. Each master controller 14 receives one or more dimmer control inputs 18A from one or more of the conventional dimmer controllers 18. It is to be appreciated that the dimmer controller 18 may include, for example, a DMX/RDM controller, a 0-10V Dimmer(s), a TRIAC dimmer(s) or an Electronic Low Voltage (ELV) Dimmer(s) and the dimmer control inputs 18A are conventional, standard output control signals of the corresponding types of dimmer controllers 18. More generally, any conventional electrical controller can be accommodated by providing a suitable interface for obtaining a controller setting. Other controllers include current loop controllers as commonly used in the industrial process control of instruments. One such class of controllers is known as 4-20 mA controllers. Also, the technology of the disclosure is applicable to Ethernet-based protocols, such as Art-Net, streaming architecture for control networks (SACN), or other such protocol.

The master controller 14, upon receipt of the dimmer control inputs 18A, first converts the conventional, standard control input or inputs 18A from the one or more dimmer controllers 18 into corresponding powerline control signals 14A. Next, the master controller 14 imposes the powerline control signals 14A onto the wiring of the power distribution system 12, together with the conventional power signal 12P present on power distribution system 12, and also transmits the powerline control signals 14A through the power distribution system 12 to each one of the slave units 16. In an exemplary embodiment, the powerline control signals 14A may be, for example, in the form of a frequency shift keyed (FSK) signal or a differential phase shift keyed (DPSK) signal. The command code format of the powerline control signals 14A may, for example, be that of a commercially available controller format or a version thereof modified for the specific needs of a powerline communication control system 10 or may be designed specific for the powerline communication control system 10.

According to the present disclosure, the powerline control signal 14A may be in the form of broadcast commands to all of the slave units 16 connected with the power distribution system 12, so that all slave units 16 are controlled concurrently and in parallel with one another. Alternately, the powerline control signals 14A may be specifically addressed to an individual slave unit 16, or to groups/subsets of the slave units 16, thereby allowing individualized control of one or more of the slave units 16 of the powerline communication control system 10.

Next referring to an exemplary slave unit 16, as illustrated in FIG. 1, slave unit 16 includes one or more LED lighting units 16L. It is noted that only three slave units 16 are diagrammatically shown in FIG. 1, but it is to be appreciated that the quantity of LED lighting units 16L can vary depending upon the particular application. Each slave unit 16 also includes a communication and power supply node 16A. As indicated, each communication and power supply node 16A has a power and control input 16B, 16B which is connected with the power distribution system 12 in order to receive both the powerline control signals 14A and the power signal 12P from the power distribution system 12. As indicated in FIG. 1, the communication and power supply node 16A of each slave unit 16 initially separates the received powerline control signals 14A from the received power signal 12P, and then generates a DC power output 16P from the power signal 12P, and then supplies the generated DC power signal 16P to the lighting units 16L in order to power the lighting units 16L as controlled by the master controller 14. The communication and power supply node 16A of each slave unit 16 also decodes the received powerline control signals 14A and, in turn, then generates corresponding lighting control commands 16C and subsequently supplies the control commands 16C to the lighting units 16L so as to control the operation of the lighting units 16L.

Figure 2:
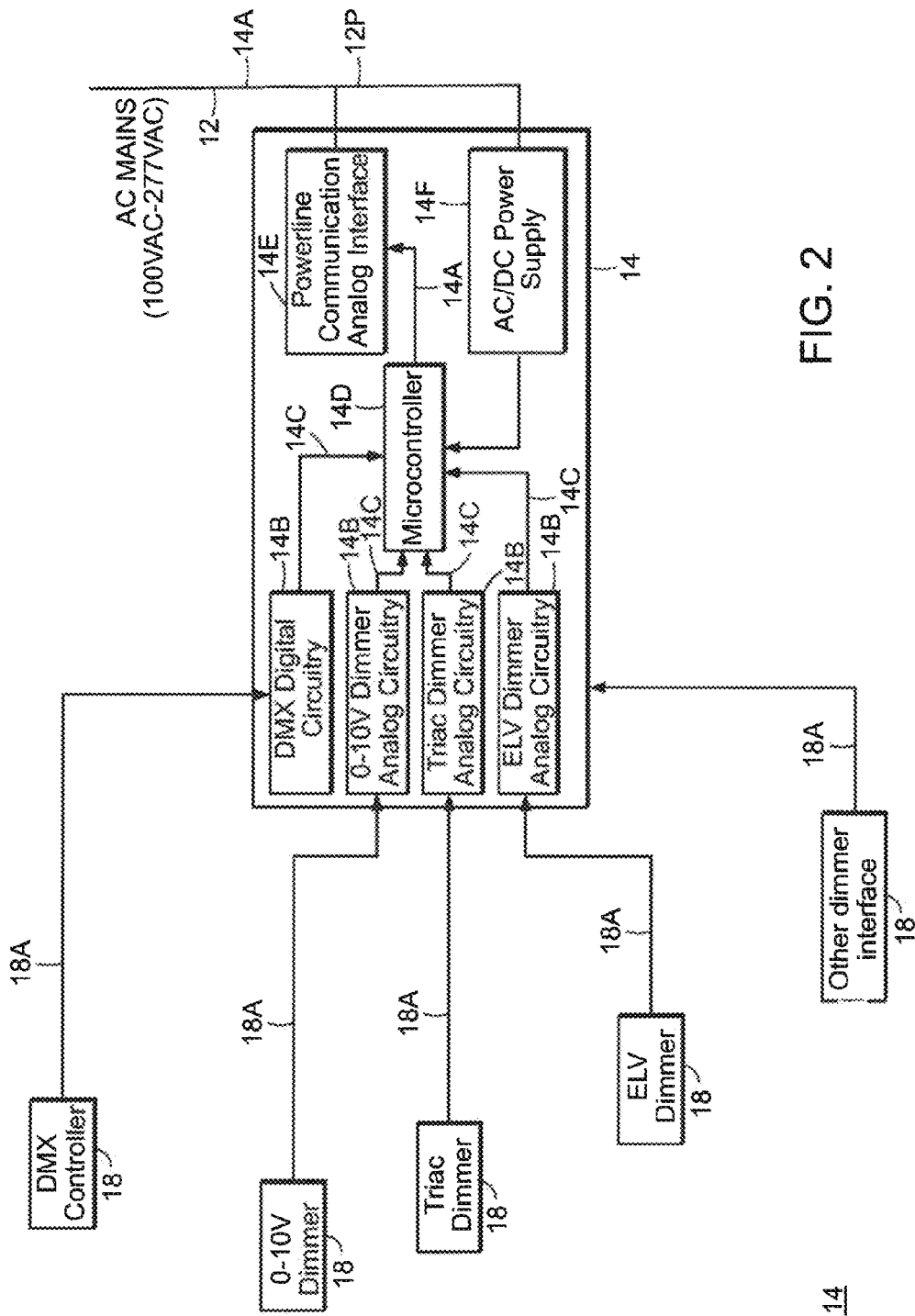
FIG. 2 is a functional block diagram of an embodiment of a master controller of a powerline communication control system for LED lighting fixtures.
Figure 3:
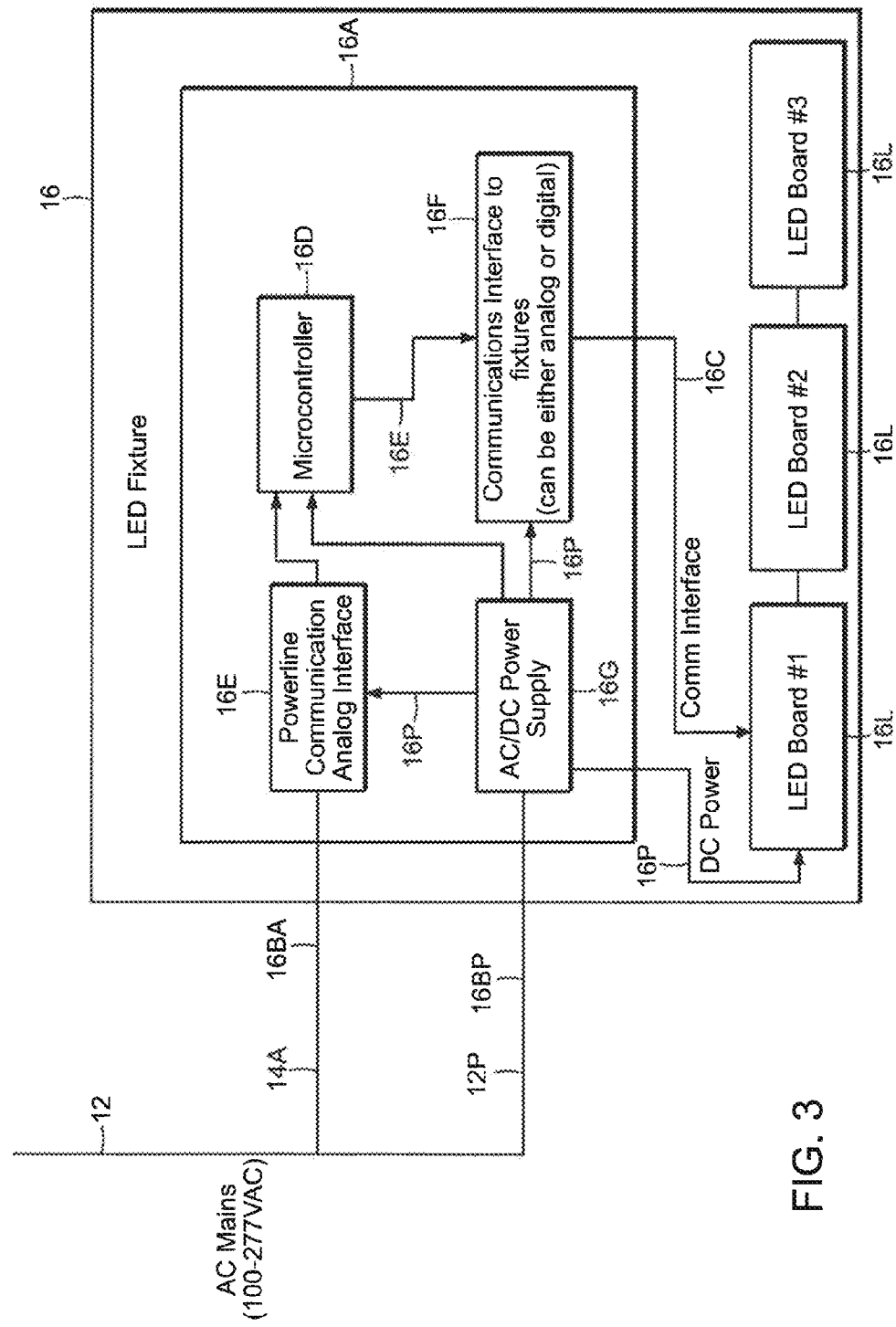
FIG. 3 is a functional block diagram of an embodiment of a slave LED lighting fixture unit of a powerline communication control system for LED lighting fixtures.

FIGS. 2 and 3 include detailed schematic block diagrams of master controller 14 and the slave unit 16, respectively, according to some exemplary embodiments. As illustrated in FIG. 2, each master controller 14 includes one or more dimmer control conversion circuits 14B for converting the control inputs 18A, from the corresponding dimmer controllers 18, into the corresponding dimmer command inputs 14C to a microcontroller 14D which, under control of at least one program(s) residing in a resident memory (not shown for purposes of clarity) to generate the corresponding powerline control signals 14A, which are then superimposed onto the wires of the power distribution system 12 and the power signal 12P present thereon by a powerline interface 14E for transmission of the slave units 16. As indicated, each master controller 14 also includes other necessary circuitry, such as a power supply 14F for receiving electrical power from the power distribution system 12.

Referring to FIG. 3, the power and control input 16B of each communication and power supply node 16A of each slave unit 16 includes a control input 16BA, connected to the power distribution system 12 and to the input of a communication interface 16B which receives the powerline control signals 14A and the power signal 12P from the power distribution system 12, separates the powerline control signals 14A from the power signal 12P, and provides corresponding control signals 14A to an input of a slave control microcontroller 16D. The slave control microcontroller 16D, operating under control of at least one program(s) residing in a memory (not shown for purposes of clarity), in turn, decodes control signals 14A and generates corresponding slave control signals 16E, which are converted into corresponding analog or digital lighting control commands 16C, by a fixture interface 16F, and then communicated to each one of the lighting units 16L.

A power input 16BP is likewise connected to the power distribution system 12 to receive the power signal 12 with the superimposed powerline control signals 14A and is connected to the input of a power supply 16G which, in turn, generates DC power outputs 16P which are supplied to the circuits of the communication and power supply node 16A and eventually to the lighting units 16L of the slave unit 16.

Figure 4:
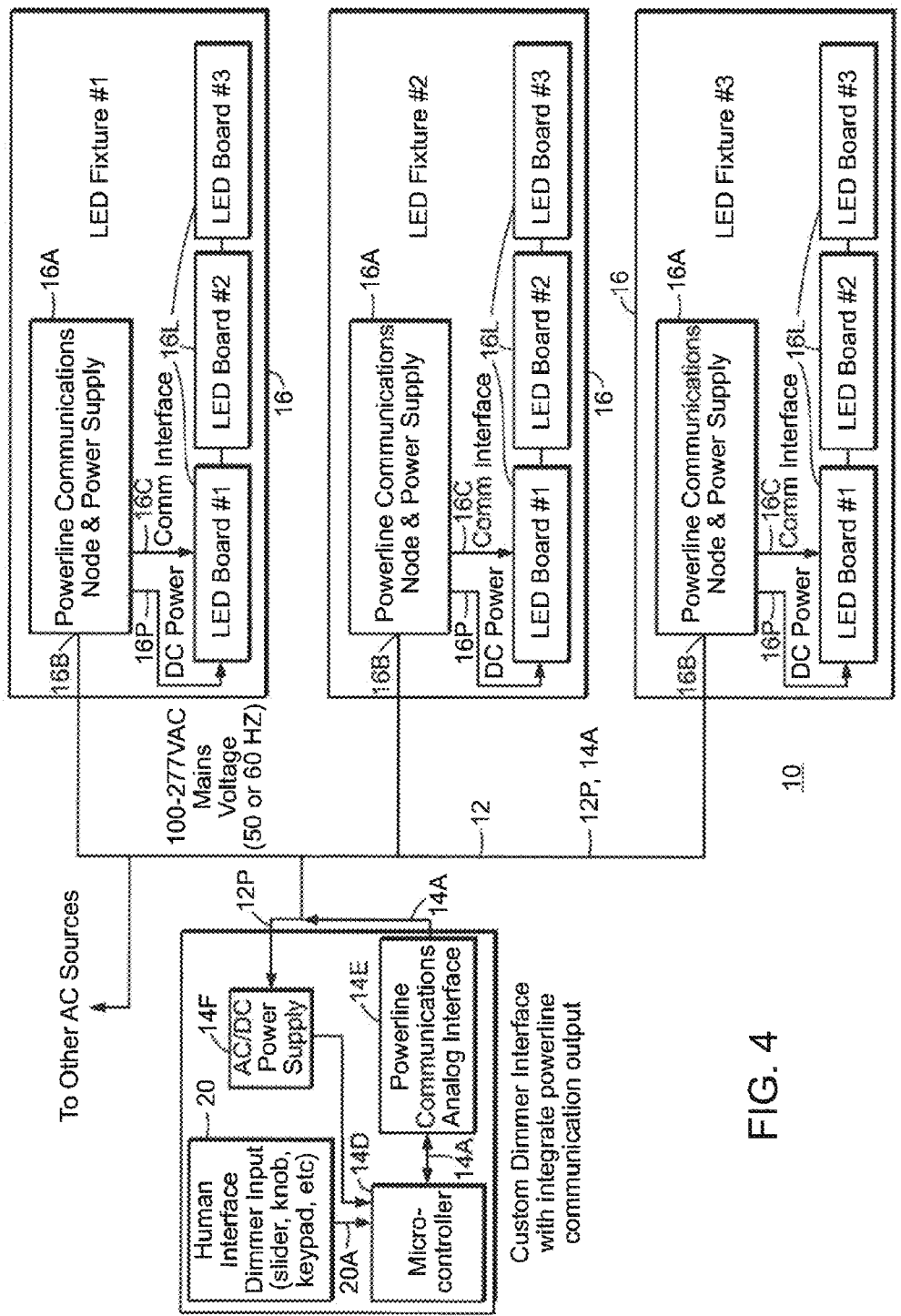
FIG. 4 is a functional block diagram of an alternative embodiment of a powerline communication control system for LED lighting fixtures.

FIG. 4 includes a schematic block diagram of an alternate powerline communication control system 10, according to some exemplary embodiments. Referring to FIG. 4, the illustrated embodiment is generally similar to the embodiments of a powerline communication control system 10 as illustrated in FIGS. 1, 2 and 3. However, according to this embodiment, the dimmer controllers 18 and the dimmer control inputs 18A are replaced with a human interface controller 20 for generating human interface control inputs 20A. It is to be appreciated that the control inputs 20A may be generated under the control of, for example, a knob, a slider, a keypad or some other conventional direct human input control device, thereby allowing direct human control of the slave units 16 without the associated intervention and cost of standardized, conventional dimmer controls 18.

Figure 5:
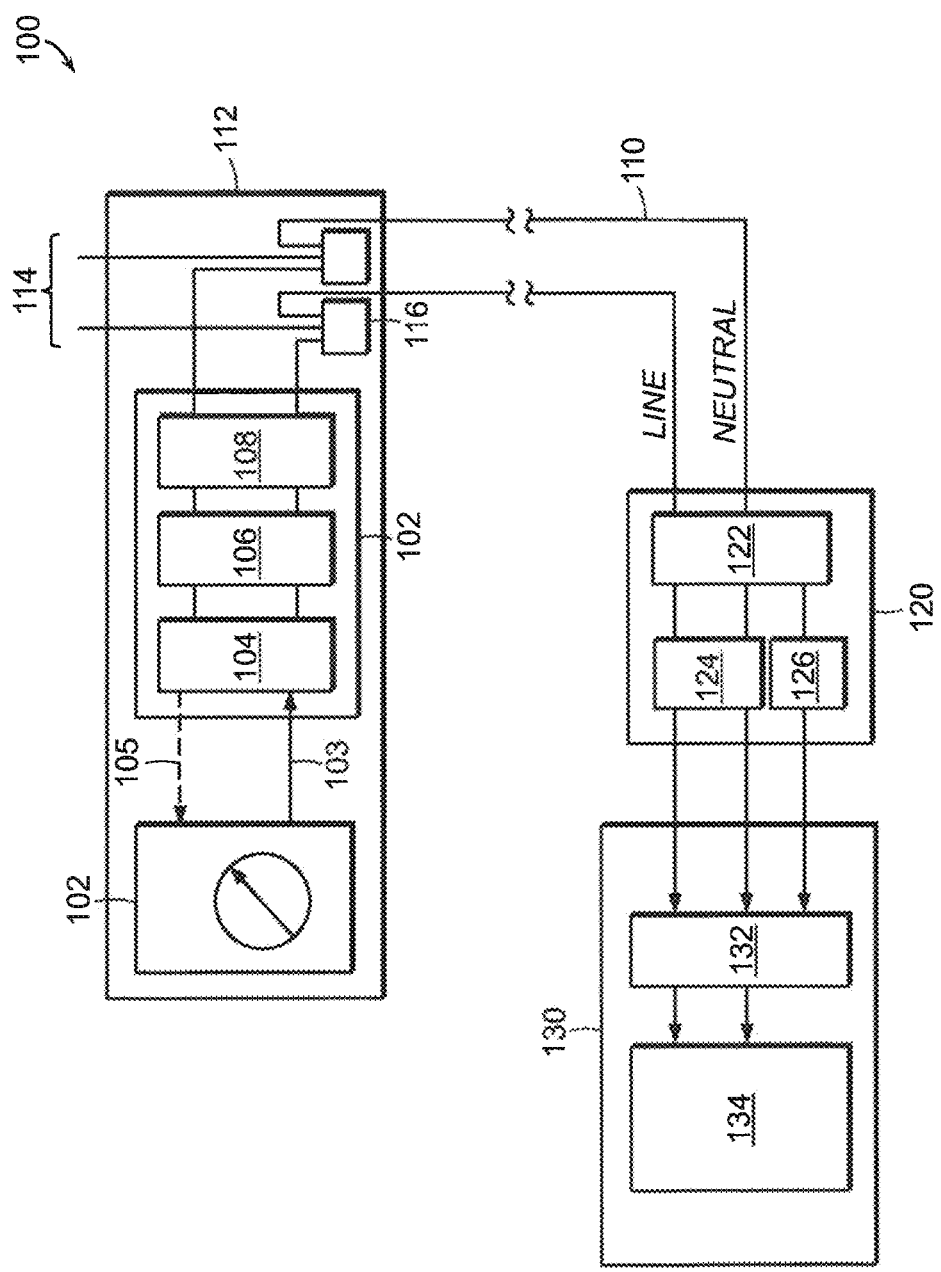
FIG. 5 is a functional block diagram of another embodiment of a powerline communication control system for controlling lighting fixtures.

FIG. 5 includes a functional block diagram of another alternate powerline communication control system 100 for controlling lighting fixtures, according to some exemplary embodiments. The system 100 includes a master controller, or adapter 102, configured to interpret a response or input 103 received from a conventional controller 102 (also referred to as a legacy controller). At least one advantage of having an adapter 102 is an ability to obtain and otherwise interpret inputs from any class of dimmer controllers, such as those described above. The adapter 102 includes a configurable interface 104 suitable for interconnecting to at least one of a variety of different conventional dimmer controllers. The adapter 102 also includes a lighting control processor 106 in communication with the configurable interface 104. The lighting control processor 106 is adapted to generate a lighting unit command output in a lighting unit system command format in response to an input received from the conventional controller 102. In particular, for user-adjustable controllers, such an input received from the controller 102 provides an indication of a user-adjusted setting of the controller 102.

In at least some embodiments, the adapter 102 also includes a power distribution system interface 108. The power distribution system interface 108 is in communication with the lighting control processor 106 and adapted for interconnection to a power distribution system 110. The power distribution system interface 108 is adapted to superimpose the lighting unit system command output of the lighting control processor 106, onto the power distribution system 110, to all for dissemination of the lighting unit system command to one or more electrical units to be controlled.

In at least some embodiments, the adapter 102 can be accommodated within a housing 112, such as an electrical housing or box 112 adapted to accommodate a typical single or multi-gang electrical switch. Accordingly, in at least some embodiments, such an adapter 102 can be installed together with a conventional controller 102, within a common multi-gang standard electrical box 112. The box 112 can be fed by an AC power feed or circuit 114, which can be split within the box 112 (e.g., using wire connectors 116) to power the adapter 102 and to a second set of electrical conductors 110 providing AC facility power to the adjustable power to one or more controlled electrical devices. The power distribution system interface 108 can be configured to convey an indication of the control setting to the one or more controlled electrical devices (e.g., lighting unit(s)) by any suitable powerline communications (PLC) protocol, such as those described herein and their equivalents.

In some embodiments, the configurable interface 104 reads an output of the conventional controller 102. Alternatively or in addition, the configurable interface 104 provides a stimulus 105 (shown in phantom) that produces a response 103 of the conventional controller 102, suitable for determining a user-adjusted setting of the controller 102.

In some embodiments, the configurable interface 104 includes the one or more dimmer control conversion circuits 14B (FIG. 2). In such embodiments, the lighting control processor 106 (e.g., the microprocessor 14D of FIG. 2) is configured to monitor inputs from each of the one or more dimmer control conversion circuits 14B. Thus, each conversion circuit 14B can be in independently in communication with the microprocessor 14D through a respective interface. The microprocessor 14D can routinely monitor each of the respective inputs, for example according to a schedule, to detect changes. Upon detecting a change, the microprocessor 14D can be configured to take a suitable action, such as generating the corresponding powerline control signals 14A.

In at least some embodiments, the powerline communication control system 100 also includes at least one device controller 120. In the example embodiment, the controller can be referred to as a powerline communication node and power supply 102. The device controller 120 includes a power distribution system interface 108 adapted for interconnection to the power distribution system 110. The device controller 120, also referred to as a command receiving interface, is further adapted to separate the lighting unit system command output from the power distribution system 110 when connected thereto. For example, the device controller 120 includes a powerline communication modem 122 receiving AC power including any superimposed lighting unit system command outputs. The powerline communication modem 122 is adapted to separate the received power and command signals into a separate AC power signal and a separate lighting unit command signal.

For controlled devices that operate under electrical power that might differ from the distributed (e.g., AC) power, the device controller 120 includes one or more power conversion modules 124. Such a power conversion module 124 can convert any suitable distributed power, such as AC or DC power, to any other suitable power, such as DC or AC power. Such power conversion modules 124 are commonly referred to as one or more of power supplies, power converters, and power inverters. In the illustrative example, the power supply 124 converts 120V AC to a DC power (e.g., 12 volts) suitable for controlling a solid state lighting unit 130. It is understood that one or more such power conversion modules 124 can be included and any given power conversion module 124 can be configured to provide more than one output (e.g., +/−12V, 5V, 3.3V). Such power outputs can be used to power one or more of the device controller 120 and any device modules connected thereto.

In the illustrative example, the device controller 120 includes a slave control processor 126 in communication with the command receiving interface 122 and adapted to convert the received lighting unit system command output into a corresponding lighting unit control command. The lighting unit control command is forwarded to the solid state lighting unit 130. In the illustrative embodiment, the solid state lighting unit 130 includes a lighting unit interface 132 adapted for interpreting the lighting unit control command and suitably driving the solid state lighting unit 130 in response to the user-adjusted setting of the interconnected one of the conventional dimmers 102.

For example, the solid state lighting unit 130 includes one or more LED modules or circuit boards 134. Each circuit board 134 can be populated with one or more lighting elements, or lamps, such as LEDs. One or more of the circuit board 134 and the individual LEDs, singly or in groups, can be independently addressable. For such embodiments, the lighting unit system command outputs can include messages having an address portion and a command portion. The slave control processor 126 interprets any received lighting unit system command output, for example, identifying an addressee as well as the command itself. The slave control processor 126 converts the received lighting unit system command output into a corresponding lighting unit control command. The command can include the address, which can be interpreted to one or more interconnected lighting units 130. Alternatively or in addition, the slave control processor 126 can be preconfigured with the addresses of any interconnected lighting units 130, selectively forwarding such messages to addressed lighting units 130.

Continuing with the illustrative example, a lighting unit system command output includes an address of the lighting unit 130 and a command to set the lighting unit 130 at an illumination level corresponding to a user-adjusted setting of the controller 102. The slave control processor 126 provides a suitable lighting unit control command instructing the lighting unit to illuminate at the user-desired setting. The lighting unit interface 132 receives the command and drives the LED board(s) 134 with a corresponding current to produce the user-desired illumination. The lighting unit 130 can remain at the desired setting until a subsequent command or instruction is received to change the illumination setting, in which instance, the lighting unit 130 will respond accordingly.

Although addresses are possible, it can also be possible to provide commands without an address or with a global address, in which instance all interconnected lighting units 130 respond to the instruction. It is also possible for more than one device controller 120 to independently control the same lighting unit 130. For example, the device controller 120 can receive inputs from more than one power distribution circuit 110, or a single power distribution circuit can be interconnected to more than one device controller 120. For such configurations, the device controller 120 can simply monitor received commands without regard to their source. Thus, two separate controllers on a three-way controlled lighting unit 130 can independently control a setting of the lighting unit, for example, according to the last command received. In at least some embodiments, the device controller 120 is configured to send commands in response to a detected change in a user-adjusted setting of an interconnected controller 102.

In some embodiments, the device controller 120 can be included within the lighting unit 130. Alternatively or in addition, one or more of the power conversion module 124 and the slave control processor 126 can be included in the device controller 120, as illustrated, in the lighting unit 130, split between the device controller 120 and lighting unit 130, or even as separate modules.

Figure 6:
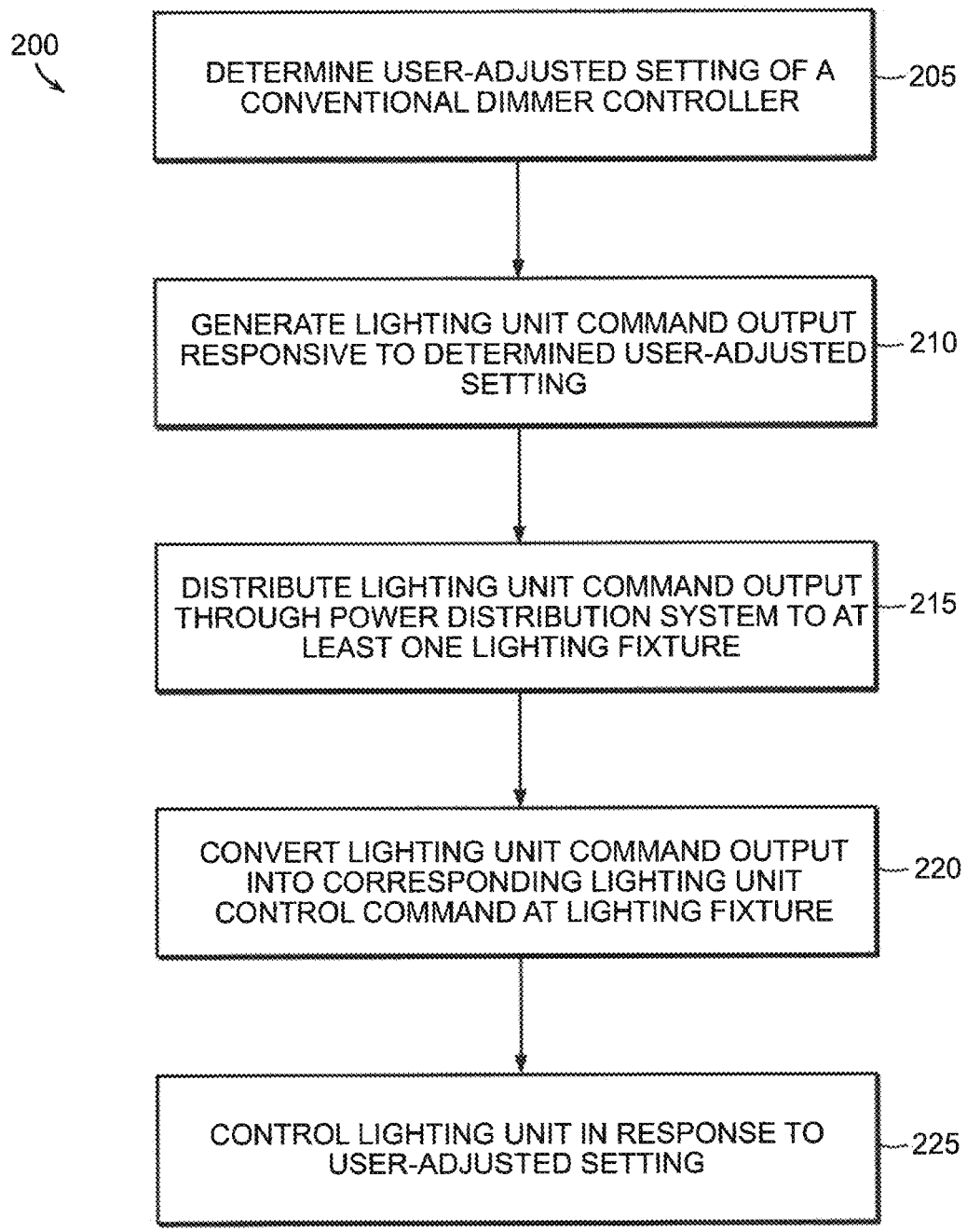
FIG. 6 is a flow diagram of an embodiment of a process for controlling lighting fixtures.

FIG. 6 includes a logical flow diagram of an embodiment of a process 200 for controlling lighting fixtures. The process 200 includes determining a user-adjusted setting of a conventional dimmer controller at 205. A lighting unit command output is generated at 210, responsive to the determined user-adjusted setting. The lighting unit command output is distributed at 215, through power distribution system to at least one lighting fixture. The lighting unit command output is converted at 220, into corresponding lighting unit control command at lighting fixture. The lighting unit is controlled at 225, in response to user-adjusted setting.

While FIGS. 1 and 2 generally show use of a hard wire connection for coupling the standardized, conventional dimmer control 18 to the dimmer control conversion circuit 14B of the master controller 14 for supplying an input thereto, it is to be appreciated that such input signals can be supplied from the dimmer control 18 to the respective dimmer control conversion circuit 14B via either a conventional wireless connection or via a conventional Ethernet connection. As such arrangements are conventional and well known in the art, a further detailed description concerning the same is not provided.

According to the current disclosure, a powerline communication system is manufactured and sold by Lumenpulse Group Inc. of Montreal, Canada, under the trademark LUMENTALK®, which is a registered trademark of Lumenpulse Group Inc. According to the present disclosure, the technology is a LUMENTALK® powerline line modem embedded into a microcontroller.

Figure 7:
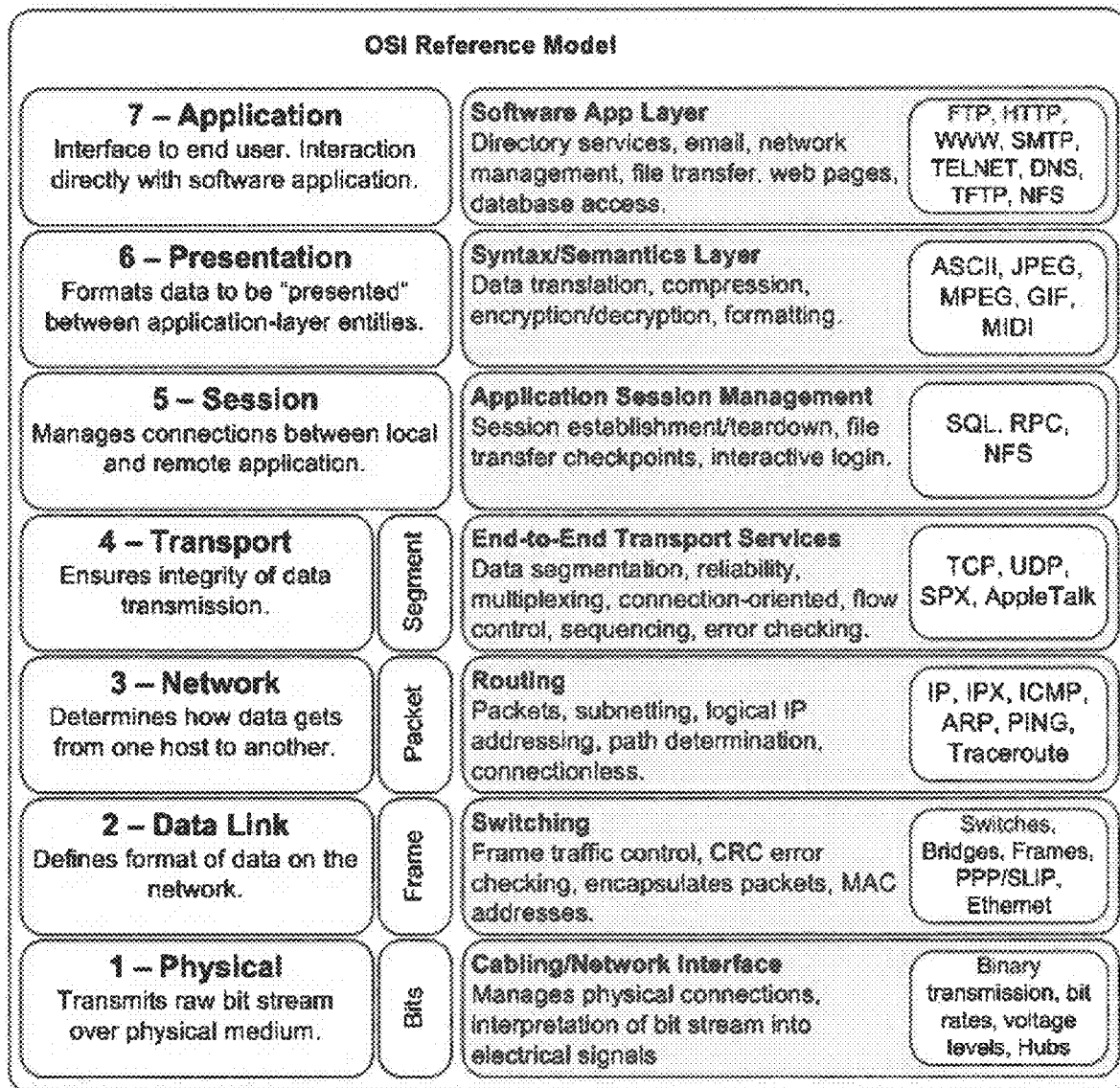
FIG. 7 is a functional block diagram of the OSI Communication Mode.

Currently, all LUMENTALK®-enabled products use a custom application-specific integrated circuit (ASIC) chip, which is commonly referred to as the "LTK-1" ASIC. This chip is a powerline modem. Referring to the Open Systems Interconnection (OSI) model as illustrated in FIG. 7, the LTK-1 ASIC covers Layers 1 and 2. The upper layer of the OSI model for LUMENTALK® communication is implemented by a microcontroller (MCU). In this prior configuration, the LTK-1 ASIC is used as an external "peripheral" to the microcontroller.

Figure 8:
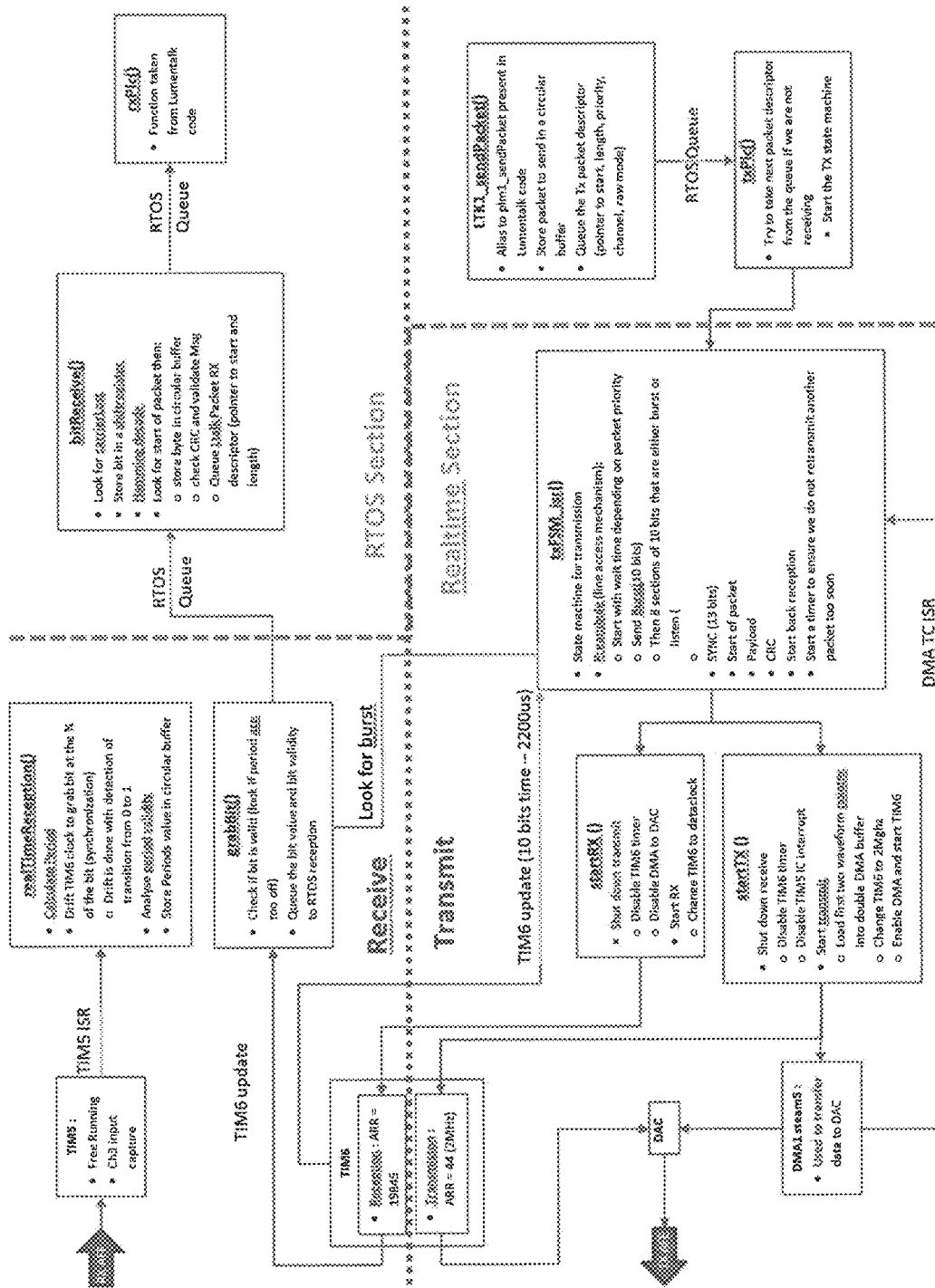
FIG. 8 is a flow diagram of the schematic functional diagram of LTK-1 on a microcontroller.

In contrast with the prior technology, the technology of the present disclosure implements all of the OSI layers for LUMENTALK® communication inside a single microcontroller (MCU). Accordingly, the technology of the present disclosure is often referred to as "LTK-2." To implement this configuration, extensive use is made of the internal peripherals of the microcontroller, including direct memory access (DMA), timer, and digital-to-analog converter (DAC). FIG. 8 includes a detailed schematic functional diagram of the technology of the current disclosure, according to some exemplary embodiments. FIG. 9 includes a schematic functional block diagram of the technology of the current disclosure, according to some exemplary embodiments. FIG. 9 illustrates individual functional blocks of the powerline modem technology of the disclosure, and is analogous to the functional block diagrams of FIGS. 1-3 described in detail above. Referring to FIGS. 8 and 9, the following provides detailed description of the functional blocks for TX (transmit) and RX (receive), which are illustrated in the functional block diagrams of FIGS. 8 and 9.

Referring to the block diagram of FIG. 9, the diagram illustrates the elements of the present technology and their interaction with powerline communication analog interface 500, analogous with the powerline communication analog interfaces 14E and 16E of FIGS. 2 and 3, respectively. Similarly, powerline modem 600 illustrated in FIG. 9 is analogous to powerline communication modem 122 of FIG. 5. Likewise, microcontroller 700 is analogous to microcontrollers 14D, 16D and 126 of FIGS. 2, 3 and 5, respectively. It is noted that, according to the present disclosure, powerline modem 600 of FIG. 9 is illustrated as being implemented within microcontroller 700. In contrast, in the embodiment illustrated in FIG. 5, microcontroller 126 is implemented separately from powerline communication modem 122.

Transmit (TX)

Continuing to refer to the illustrative embodiment of the instant disclosure in FIGS. 8 and 9, LUMENTALK® communication uses minimal-FSK modulations in the Cenelec D band. To enable implementation of the operation of the OSI Layer 1 (physical layer), some FSK modulation (TX) and demodulation (RX) capabilities are implemented. For modulations (TX), it is contemplated that a DAC is used to generate the FSK signal. That DAC is fed with a sine wave table by DMA. To that end, it is important that the DMA have "double buffer" capabilities, double buffer meaning that there is one buffer currently feeding the DAC while the other could be changed. While the DAC sends a bit (which takes 220.5 uS), the MCU decides which bit (from the DMA sine wave table) to send next and queues it into the other buffer. When transmitting, this decision happens every 220.5 microseconds. It is noted that without double-buffer DMA, it would be impossible to have a continuous signal coming out of the DAC. The txFSM_isr function is triggered at every DMA complete interrupt (220.5 uS).

It should be noted that, in accordance with exemplary embodiments, the DAC output can be run at, for example, 2 MHz and there are, for example, 441 samples stored in RAM for one bit. One bit contains 32 cycles or 31.5 cycles of either F0 or F1 sine waves. This way, each sine wave has around 13 samples per cycle ensuring that the sine wave is "clean" and does not contain too much harmonic on the output. The DAC output is then fed to the TX analog front end (AFE). Each F0 and F1 sine wave tables are stored twice, one starting at 0 degree and the other starting at 180 degrees. This creates a total of 4 sine wave tables to choose from because a bit 0 is only 31.5 cycle of F0.

According to another aspect of the present disclosure, for OSI Layer 2 (Data Link), every byte to send is cut in half (cut into nibbles) and then encapsulated in a hamming encoded series of bits. For every nibble (5 bits=4 data bits+1 control bit), the instant disclosure envisions sending 11 bits. For each bit of the nibble, there is one parity bit and there is one more parity bit for the whole nibble ((4 data bits+1 control bit)+5 parity bit+1 global parity=11 bits).

It is worth noting that the DAC block refers to the digital to analog converter inside the microcontroller. The DAC has 12-bit input capabilities. Its input data is feed by the DMA and runs at a 2 MHz rate using events triggered by the timer 6 (TIM6).

It is worth noting that TIM6 refers to timer number 6 inside the MCU. In transmit mode, the Timer6 is used to trigger the DAC conversion. In some exemplary embodiments, it triggers at a 2 MHz rate.

It should be noted that, in accordance with exemplary embodiments, DMA1 stream5 refers to the stream 5 of DMA1 inside the MCU. The DMA on this MCU has double buffer capabilities, meaning, it is contemplated that by nature of its design, when the DMA is streaming from one memory location on a buffer, the other buffer can be pointed to another place in memory.

As another aspect of the present disclosure, when the MCU boots, the present disclosure generates in RAM four different digital signals: Frequency 1 (F1), Frequency 1 shifted by 180-degrees (F1-180), frequency 0 (F0) and frequency 0 shifted by 180 degrees (F0-180). Theses 4 signals have each 441 samples which correspond to a bit time (441 samples at 2 MHz=220.5 microseconds). They are "pure" single frequency sine waves with ~12 bit depth.

When a message is ongoing, it is contemplated that the DMA transfer complete interrupt service routine jobs (txFSM_isr( )) will be to point the unused buffer to the next frequency needed to form the message. It is worth noting that the DMA1 buffer transmit complete interrupt is executed every time a buffer is empty (every 220.5 microseconds), triggering the txFSM_isr( ).

It should be noted that, in accordance with exemplary embodiments, startTX( ) is executed every time the present disclosure needs to start a transmission. After "launching" the transmission, startTX( ) will no longer be needed because the txFSM_isr( ) will take care of pointing the DMA to the next digital frequency signal (either F1, F1-180, F0, F0-180) to continue the message.

According to the exemplary embodiments described herein in detail, first, startTX( ) stops the reception (disable timer capture (TIM5) interrupt and disables TIM6 (which was in "DATA clock mode" for RX. After that, it starts the output power amplifier. It is contemplated that the output power amplifier needs to be OFF when in receiving mode and ON in transmit mode.

Then, as another aspect of the present disclosure, the two DMA1 buffers are loaded with the right digital waveform frequency addresses. It is envisioned that the DMA1 and DAC are activated and TIM6 is then configured to the transmission rate of 2 MHz and started (TIM6 is now in DAC trigger event mode). The transmission will then be continued by the txFSM_isr( ) after the first DMA1 buffer gets emptied and trigs the transfer complete interrupt.

Notably, startRX( ) is the opposite of startTX( ). It is contemplated that startRX( ) will shut down the power output amplifier, and enable back the interrupt for TIM5 (timer capture) and sets the TIM6 to the data rate (TIM6 is back in "DATA clock mode").

Next, it is contemplated that txFSM_isr is called from the DMA1 transfer complete interrupt, but it can also be called from the TIM6 update interrupt when the preamble is still ongoing. txFSM_isr( ) role is to manage the transmission of a complete message. The first thing it must do to transmit is gain access to the line using the line access mechanism. This line access mechanism includes the preamble, which is a series of BURST and LISTEN sections. The preamble has nine sections of 10 bits time each (2.205 ms). Each section consists either of transmitting a BURST or listening to the line to see if we "hear" a BURST. The present disclosure alternates between BURST and LISTEN section in a random manner. After those nine sections have gone through without hearing a BURST, it is contemplated by the instant disclosure that this indicates access to the line and the ability to transmit the message. If a BURST was heard, the instant disclosure contemplates then waiting for about 20 ms before starting back the preamble again. During this 20 ms, it is contemplated that one can listen to see if the other device trying to get access to the line will take it. The present disclosure uses the startRX( ) and startTX( ) function to switch between the LISTENING mode and BURST mode of the preamble. It is contemplated that when the BURST ends, the txFSM_isr( ) is triggered from the DMA1 transfer complete interrupt and when the LISTENING mode ends, txFSM_isr( ) is triggered by the TIM6 update interrupt.

According to another aspect of the instant disclosure, after the preamble, a SYNC message is sent. The SYNC has a duration of 11 bit and its purpose is to sync the sender and the receiver data clock (TIM6). It alternates between F0 and F1 for 11 bits. After the SYNC, the SOP ("Start of Packet" which has 22 bit) is sent.

In another aspect of the present disclosure, it is contemplated that after the SOP, the priority (1 byte) and the LumenTalk channel (1 byte) of the message are sent. After that, the actual payload is sent nibble by nibble. It is contemplated that each byte of the message is separated into two nibbles. Each nibble is encoded with the hamming encoding provided by the instant disclosure. In the end, each nibble is transformed from 4 bits to 11 bits with the hamming encoding. Each one of those 11 bits correspond to a frequency needed by the present disclosure to output on the DAC. Depending on what was the last frequency that was sent, either sending the normal version or the one that is phase shifted by 180 degrees is required by the instant disclosure. This is because F1 is only 31.5 cycle during a bit time and F0 has a full 32 cycles. For each nibble that is sent, the CRC is computed. When the message reaches the end, it is contemplated that EOP (End of Packet) is sent on the line followed by the 4 nibbles of the CRC (16 bits CRC).

Notably, txPLC( ) is a high level function that triggers the transmission state machine in the modem. It was already part of the original design when the LTK1 chip modem was used instead of the LTK on MCU modem.

Receive (RX)

As another aspect of the present disclosure, for FSK demodulation (RX), the "Input Capture Timer" (ICT) internal peripheral is used (TIM5). This internal peripheral of the MCU can measure time (in clock tick) between signal edges. Before entering the signal into the MCU, it is contemplated that it is conditioned by the RX AFE. The RX AFE transforms the sine wave from the FSK signal to a square wave with the use of a comparator. This square wave is fed to the MCU ICT. The ICT interrupt is called every two edges (two complete cycles) of the incoming signal. This interrupt triggers the realtimeReception function. Notably, the realtimeReception does the following for each double cycle of the signal: calculate current period(frequency); clip period value if out of range; pass period values through State variable filter; determine if the output of the state variable filter (calculated period) correspond to bit 0 or bit 1 and push them in a shift register; and, detect transitions from bit 0 to bit 1 and from bit 1 to 0. It is envisioned that detected transition are used to sync clock between sender and receiver.

It is contemplated by the present disclosure that transitions from one "bit state" (or frequency) to the other in the realtimeReception function are used to sync the clock between sender and the receiver. Since the present disclosure does not contemplate having the clock on a separate wire like some other protocols (SPI or I2C), an approach is implemented to synchronize the sender and the receiver. The syncing of the sender and receiver is analogous to syncing (beat matching) two songs on turntables. To "beat match" two songs, it is envisioned that the user will push on one vinyl (in our case the receiving side) to try to sync with the other one. When the user feels he is far away from a beat match, he will do large (coarse) pushes on the vinyl but when they were already beat match and the two songs just slightly goes off, the pushes are going to be very gentle (fine). Similarly, in the code of the present technology, the present disclosure contemplates that if the reception clock was not activated (first frequency transition detected), then one can activate the RX clock. Notably, if the RX clock is activated but code is not currently in a receiving state (the "start of packet" (SOP) has not been detected yet), the instant disclosure contemplates looking at where the transition has happen compared to RX clock cycle. If it is not at the point desired (transition should happen in the middle of the RX clock cycle), then it is envisioned that one can push hard on the clock (coarse push). Similarly, if the RX clock is activated and code is in a receiving state (SOP was received), then the present disclosure contemplates also comparing where the transition has happen compared to clock cycle. Again, if it is not at the point desired (50-60% of the clock cycle), then it is envisioned that one can push slightly on the clock (fine push).

It should be noted that, in accordance with exemplary embodiments, the realtimeReception function is important to the demodulation of the FSK signal, and is triggered by the interrupt function of the ICT (TIM5). With an incoming LumenTalk signal (or just noise on the line), it is contemplated that the MCU is in this interrupt function about 30% to 40% of the time (30% to 40% CPU usage). As implied by its name, this function is envisioned to run in "real-time" as soon as the interrupts initiates, and has the highest priority.

According to the exemplary embodiments described herein in detail, when the RX clock is started (TIM6 in "DATA clock mode"), each time the clock ends a cycle (rx data rate is 4535 kb/s) grabBits function gets called. This function looks at previous period's calculations (shift register) done by realtimeReception and determines if the bit is a 0 or a 1, and also attributes a validity value to this bit. The validity of the bit is determined by counting the number of periods that had valid timings. If more than half the periods had invalid timing, the bit is invalid. According to the present disclosure, the bit and its validity informations are queued (using a freeRTOS queue) to bitReceived function. If too much invalid bits are received in a row, the bitReceived function will declare a "carrier lost" state and the bitReceived state machine will be reset and the current message will be lost.

In accordance with another aspect of the present disclosure, each bit gets put in a shifting register inside the bitReceived function. It is contemplated that because the bitReceived function resides inside the RTOS, it is executed asynchronously from the real-time section of the code. When a start of packet (SOP) pattern is detected in the shift register, the bitReceived function changes its state to receiving, and starts to decode incoming hamming encoded nibble. In accordance with the present disclosure, the function grabs every 11 bits and decode them to data nibble. When it decodes an End of Packet (EOP), it grabs the next 4 nibbles and stores them as the cyclic redundancy check (CRC) validation data. It is contemplated that it then validates that the received CRC data correspond to the calculated one. Once validated, the complete packet gets queued to the "regular" Lumentalk stack (the one that was also present in the MCU when using an external LTK1 chip).

In another aspect of the present disclosure, TIM5 represents the Timer5 in the MCU. Timer5 will trigger a timer capture interrupt every two rising edges it has received on its dedicated MCU pin. The conditioned signal from RX AFE is a square wave that has the same frequency as the sinewave that was sent on the powerline. So, for every two rising edges of the RX signal, it is envisioned that Timer5 captures the count of its timer and stores it in a register. Timer5 runs at the maximum frequency of the MCU, which in some particular exemplary embodiments is 100 MHz, meaning every count of the Timer5 corresponds to 10 nanoseconds.

Another aspect of the present disclosure introduces realTimeReception( ), the interrupt service routine (ISR) of the TIM5 capture interrupt. Every time a new timer count is recorded (every 2 signal edges), it is envisioned that this function takes the new time (timer count when interrupt happened) and calculates the period of the signal (new time−last time=period). This period is then checked to see if it fits in the boundaries of the signal (period is valid or not). If the period is an extreme value (too far from our wanted frequency) the period value is saturated before being sent to the filter.

According to the exemplary embodiments described herein in detail, the period is then passed to a state variable filter (SVF). The low pass of this filter smooths out the periods. It is contemplated that the output of the low pass is then compared with the middle point between the two frequencies. For instance, a frequency for a "1" will have a period value of 1400 and a frequency for a "0" will have a period value of 1378. Anything coming out of the low-pass filter of the SVF that is greater than 1389 will be considered a "1" and everything under 1389 will be considered a "0". (1400 timer count for two edges corresponds to a "real" signal period of 700 timer counts which is 7000 ns. This corresponds to a frequency of 142857 Hertz.) However, it is contemplated that these parameter values are exemplary only and do not limit the scope of the technology or its applications.

It is contemplated by the present disclosure that this "bit reference" corresponding to the period just received is stored in a shift register. Period validity is also stored in another shift register. The "bit reference" shift register is then examined to determine whether a transition in the signal can be identified (0000 followed by 1111 or vice versa). If a transition is spotted, it will behave differently depending on the state of the reception state machine. The approach is to synchronize the "data clock" (TIM6) with the transition in the incoming signal to capture the bit at the right time (in the middle of the bit). A bit time is 32 cycles of frequency 0 (F0) which in some exemplary embodiments is 220.5 microseconds. It is contemplated that during a bit time, the TIM5 block (timer capture) should trigger the capture interrupt 16 times.

It should be noted that, in accordance with exemplary embodiments, if data is already being received (a start of packet (SOP) has been detected by a higher level function), the present disclosure contemplates pushing or pulling the value of the TIM6 timer by a small amount (fine) to try to be at around half the bit time when the transition is detected. If this aspect of the present disclosure is not yet in a receiving state, it is envisioned that it will push or pull TIM6 by a larger value (coarse), as the value may be already close to the right spot to grab the next bit. It is noted that this is how the present disclosure synchronizes the receiving clock with the transmitter clock.

In another aspect of the present disclosure, TIM6 represents the Timer6 in the MCU. It is contemplated that Timer 6 will trigger an update interrupt when it has reached its autoreload value. This autoreload value is set to the data rate (22050 timer count corresponds to 220.5 microseconds) when in RX mode (DATA clock mode).

Another aspect of the present disclosure introduces grabBit, the interrupt service routine of TIM6 when it is in receiving mode. It is envisioned that every time TIM6 autoreloads (every 220.5 ms), grabBit( ) is executed. grabBit( ) will look at the periods that are stored in the "bit reference" shift register that was filled by realTimeReception( ) and look at the last five values of "bit reference" in the shift register (the last five received period). It should be noted that, in accordance with exemplary embodiments, if the majority of the last five period were considered "1" then the bit to grab is "1" otherwise the bit to grab is "0". grabBit( ) also looks at the shift register that contains the period validity information to determine whether the periods were out of the desired range. If more than half the period in the shift register are valid, then the bit is valid. The number of periods that were valid in the shift register is also taken. It is contemplated that these values (the actual bit, the bit validity (yes or no), and the number of valid periods) are passed on to an RTOS function called bitReceived( ) using a Queue which is a RTOS mechanism to transmit data between an ISR and a Thread.

According to the exemplary embodiments described herein in detail, bitReceived is the last part of the RX Modem section, and is slightly higher level and contains more code. It is envisioned that bitReceived will be executed every time grabBit( ) sends a queue containing the last received bit information. Since it is in the "RTOS section" and not the "real time" section, it should be noted that it might not be executed right after grabBit( ). At some point in the execution, it is contemplated that there could be multiple bit in the queue waiting to be serviced by bitReceived( ). First, it is envisioned that the function will extract the info that grabBit( ) has sent. Then, it will take the number of valid periods that were in the queued bit and stores it in an accumulator, which is saturated to either +20 or −20. If this accumulator reaches −20, it means that this aspect of the present disclosure is receiving too many invalid periods, and therefore, it can be declared that the signal is lost (carrierLost). If the carrier is lost, it is envisioned that the receiving state machine and certain variables are reset to be ready to start a new transmission.

It should be noted that, in accordance with exemplary embodiments, if the carrier is not lost, the bit that was received is added to the RX shift register. It is contemplated that this RX shift register is then passed to a hamming decoder. The output of that hamming decoder is then compared with the start of packet (SOP) value to see if a start of packet was received. If yes, bitReceived( ) will shift its state machine to the "data reception" mode. In data reception mode, every 11 bits, it is envisioned that the shift register will be passed to the hamming decoder to get the actual nibble (half a byte) that was received.

According to the exemplary embodiments described herein in detail, nibble by nibble, the received signal is reconstructed and stored in a circular buffer until an End of Packet (EOP) is received. Every time a new nibble is received, the CRC is computed. After the EOP is received, it is contemplated that the next 4 nibbles are stored in a different place because they contain the computed CRC from the source. Notably, it is envisioned that the CRC from the source is then compared with the CRC computed internally to see if they match.

It is contemplated by the present disclosure that if CRC is a match, the received message descriptor (start address in circular buffer, message length) is sent using an RTOS queue to the rxPlc( ) function. It is contemplated that rxPlc was already part of the original design when the LTK-1 chip modem was used instead of the LTK-2.

MAC (Media Access Control)

In accordance with another aspect of the present disclosure, when sending data over the powerline, it is contemplated that the LTK1 chip uses a media access control (MAC) system to ensure there are no collisions between multiple senders when in broadcast mode. Before sending a start of packet, the chip will execute the "preamble" section. This section of 90 bits is constructed of nine 10-bit messages. In a random manner, it is envisioned that the chip will either listen or send a burst (0101010101—10 bits which goes from 0 to 1). If it hears a burst when listening, this means another modem wants to talk, and the chip will wait for this modem to start sending before trying again to send its message.

To implement the MAC inside the LTK-2, it is envisioned that the receive and transmit sides operate in an alternating manner, as it was created after both modules were almost completed. The MAC is then just a state machine that switches from the transmit states to the receive states based on a random number. This state machine resides in the txFSM_isr function. When listening for burst packet, it is contemplated that the bitreceived function will look out for a burst packet pattern in its shift register.

It should be noted that by changing the realtimeReception function block to a signal analysis block rather than just measure periods of the signal with a timer capture, system operation can be modified. By doing the signal capture with an ADC and using onboard DSP, it is contemplated that the system can demodulate the FSK signal.

It is contemplated that the modem of the disclosure could be used on other mediums than the powerline. As an illustrative example, it could potentially be used on a dedicated line or on a DC bus. As an additional illustrative example, it could be modified to be used at other frequencies than the Cenelec D band. With modification to the firmware, it is envisioned that a standalone modem that could be used with another MCU (just like the regular LTK-1 ASIC modem) can be created.

Although various aspects of the present disclosure are described herein in terms of various exemplary embodiments, it should be understood that variations and modifications may be made to the disclosure described herein to adopt it to various usages and conditions within the scope of applicant's invention as claimed herein.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof.

All patents and publications mentioned in this specification are herein incorporated by reference to the same extent as if each independent patent and publication was specifically and individually indicated to be incorporated by reference.

The invention claimed is:

1. A powerline communication control system for controlling a lighting fixture, comprising a microcontroller, the microcontroller comprising a master controller and a plurality of lighting fixture controllers;
   the master controller, comprising:
      a conventional dimmer interface configured to interconnect with a plurality of different conventional dimmer controllers;
      a lighting control processor in communication with the dimmer interface, the lighting control processor generates a lighting unit command output in a lighting unit system command format in response to an indication of a user-adjusted setting of any interconnected plurality of different conventional dimmer controllers received from the conventional dimmer interface; and
      a power distribution system interface in communication with the lighting control processor and configured to interconnect with a power distribution system, the power distribution system interface superimposes the lighting unit system command output onto the power distribution system when connected thereto; and
   each of the plurality of lighting fixture controllers comprising:
      a command receiving interface configured to interconnect with the power distribution system, the command receiving interface separates the lighting unit system command output from the power distribution system when connected thereto;
      a slave control processor in communication with the command receiving interface and converts the received lighting unit system command output into a corresponding lighting unit control command; and
      a lighting unit interface for providing the lighting unit control command to its respective lighting unit to control the respective lighting unit in response to the user-adjusted setting of any one of the interconnected conventional dimmers;
   wherein the master controller and the plurality of lighting fixture controllers comprise a modem embedded in the microcontroller, wherein the modem receives and outputs one or more signals from a single interface external to the microcontroller.

2. The powerline communication control system of claim 1, wherein each dimmer controller of the plurality of different conventional dimmer controllers is selected from the group consisting of: digital multiplex (DMX) dimmer controllers; command output from the power distribution system when connected thereto; a slave control processor in communication with the 0-10 volt dimmer controllers; TRIAC dimmer controllers; electronic low voltage (ELY) dimmer controllers; and current loop controllers, such as 4-20 mA control loop controllers.

3. The powerline communication control system of claim 1, wherein the power distribution system is selected from the group consisting of: an AC line; a 117 volt AC line; a 230 volt AC line; a 100 volt AC line; a 277 volt AC line; a 347 volt AC line; a DC line; a 380 volt DC line; a 48 volt DC line; a 24 volt DC line; a 12 volt DC line; and combinations thereof.

4. The powerline communication control system of claim 1, wherein the power distribution system interface comprises a modulator adapted to superimpose the lighting unit system command output an AC power signal of the power distribution system.

5. The powerline communication control system of claim 4, wherein the modulator modulates the AC power signal according to a modulation selected from the group consisting of: amplitude modulation; frequency modulation; phase modulation; binary phase shift keying modulation; quadrature phase shift keying modulation; quadrature amplitude modulation; frequency shift keying modulation; phase shift keying modulation; and combinations thereof.

6. The powerline communication control system of claim 1, wherein the at least one lighting unit comprises at least one lighting element and a lighting element driver.

7. The powerline communication control system of claim 6, wherein the at least one lamp is a light emitting diode (LED).

8. The powerline communication control system of claim 1, wherein the microcontroller includes direct memory access (DMA), timer, and digital-to-analog converter (DAC).

9. The powerline communication control system of claim 8, wherein the microcontroller includes a physical layer and a data link layer for open systems interconnections.

10. The powerline communication system of claim 9, wherein the operation of the physical layer includes FSK modulation (TX) and demodulation (RX) capabilities.

11. The powerline communication system of claim 10, wherein the FSK modulation utilizes a DAC to generate the FSK signal, wherein the DAC is fed with a sine wave table by DMA, wherein the DMA is fed by a first buffer which feeds the DAC and a second buffer configured to receive a signal from the microcontroller in order to provide a continuous signal from the DAC.

12. The powerline communication system of claim 11, wherein a DAC output is fed to a TX analog front end (AFE).

13. A method for controlling a lighting fixture, comprising:
   generating a lighting unit command output in a lighting unit system command format in response to a determined user-adjusted setting of any interconnected plurality of different conventional dimmer controllers received from a conventional dimmer interface;
   distributing through a power distribution system the lighting unit command output to a plurality of lighting fixtures;

converting at each respective lighting fixture the lighting unit command output into a corresponding lighting unit control command; and controlling each respective lighting unit in response to the user-adjusted setting of any one of the interconnected conventional dimmers, wherein the method is entirely implemented within a modem embedded in a microcontroller, wherein the modem receives and outputs one or more signals from a single interface external to the microcontroller.

14. The method of claim 13, wherein distributing through a power distribution system the lighting unit command output to at least one lighting fixture comprises:

superimposing the lighting unit system command output onto the power distribution system;

receiving from the power distribution system distributed power with the superimposed lighting unit system command output; and separating the lighting unit system command from the distributed power.

15. The method of claim 13, further comprising, detecting an electrical response of any of the interconnected plurality of different conventional dimmer controllers received from a conventional dimmer interface, the electrical response variable according to the user-adjusted setting.

16. The method of claim 15, further comprising:

isolating any of interconnected plurality of different conventional dimmer controllers from the power distribution system; and electrically stimulating any of interconnected plurality of different conventional dimmer controllers, thereby inducing the electrical response.

17. The method of claim 13, wherein the microcontroller includes direct memory access (DMA), timer, and digital-to-analog converter (DAC).

18. The method of claim 17, wherein the microcontroller includes a physical layer and a data link layer for open systems interconnections.

19. The method of claim 18, wherein the operation of the physical layer includes FSK modulation (TX) and demodulation (RX) capabilities.

20. The method of claim 19, wherein the FSK modulation utilizes a DAC to generate the FSK signal, wherein the DAC is fed with a sine wave table by DMA, wherein the DMA is fed by a first buffer which feeds the DAC and a second buffer configured to receive a signal from the microcontroller in order to provide a continuous signal from the DAC.

21. The method of claim 20, wherein a DAC output is fed to a TX analog front end (AFE).

* * * * *